United States Patent [19]

Linz et al.

[11] Patent Number: 4,671,555
[45] Date of Patent: Jun. 9, 1987

[54] AIR GUIDE ARRANGEMENT FOR THE REAR OF A VEHICLE

[75] Inventors: Herbert Linz, Pforzheim-Hohenwart; Klaus-Peter Lehmann, Muehlacker, both of Fed. Rep. of Germany

[73] Assignee: Dr. Ing. h.c.f. Porsche Aktiengesellschaft, Fed. Rep. of Germany

[21] Appl. No.: 845,626

[22] Filed: Mar. 28, 1986

[30] Foreign Application Priority Data

Mar. 30, 1985 [DE] Fed. Rep. of Germany ....... 3511809

[51] Int. Cl.⁴ .............................................. B62D 32/00
[52] U.S. Cl. ..................................................... 296/1 S
[58] Field of Search ......................................... 296/1 S

[56] References Cited

U.S. PATENT DOCUMENTS 3,089,728 5/1963 Shumaker ............................ 296/1 S
4,170,377 10/1979 Ingram ................................. 296/1 S
4,558,898 12/1985 Deaver ................................. 296/1 S

FOREIGN PATENT DOCUMENTS 2649953 5/1976 Fed. Rep. of Germany ...... 296/1 S
2555006 6/1977 Fed. Rep. of Germany ...... 296/1 S Primary Examiner—Robert R. Song
Attorney, Agent, or Firm—Barnes & Thornburg

[57] ABSTRACT

The invention relates to an air guidance device which responds to externally applied forces by movement whereby the externally applied forces do not damage said air guidance device. Embodiments of this invention include at least one hinge pivotally attached to the body wall at the rear of a motor vehicle. Said hinge arrangements allow air guidance device to be pivoted upwardly when subjected to external forces such as a washing brush of a car wash when said brush passes over a passenger car in a driving direction. The air guidance device so configured is neither damaged when driving through the car wash, nor is the washing cycle unintentionally interrupted.

34 Claims, 11 Drawing Figures

AIR GUIDE ARRANGEMENT FOR THE REAR OF A VEHICLE

BACKGROUND AND SUMMARY OF THE INVENTION

The invention relates to an air guidance apparatus at the rear of a motor vehicle, especially a passenger car, which extends in vehicle transverse and longitudinal direction whereby at least one end portion of the air guidance device located rearwardly, when viewed in driving direction, extends in a manner forming a V-shaped or the like gap with an underlying vehicle body wall.

An air guidance apparatus of the above-mentioned type described in German Utility Model (DE-GM) No. 72 40 740 is fixedly attached to a vehicle body wall having a rearward end portion leading away from the vehicle body wall and reaches with one section beyond the same. The side of the rearward end portion facing the vehicle body wall extends in about a right angle to said wall.

It has been a disadvantage with vehicles including such a construction of an air guidance apparatus which resulted in either damage to the air guidance apparatus when passing through an automatic car wash of a certain kind, or that the washing brush of the car wash is caught by the profile of the vehicle body wall and the air guidance device. In the latter instance, the car wash will automatically come to a stop without ending the wash cycle. Such disturbances occur especially with car wash stations of the kind whereby the wash cycle provides for a forward phase and a return phase of the washing brush and the washing brush in both of these respective phases, rotates only in one direction.

It is an objective of the present invention to develop an air guidance device at the rear of a motor vehicle, that will allow the car to be washed at an automatic car wash without damaging the air guidance device or stop the operation of the car wash.

This objective is solved in accordance with the invention by providing force cushioning structure allowing movement of at least a portion of the air guidance device in response to forces such as experienced in a car wash. According to certain preferred embodiments, the support structure acts as the force cushioning structure allowing the air guidance device to pivot upward in response to forces experienced in a car wash or the like.

Advantages obtained with preferred embodiments of the present invention, such as providing a pivotable arrangement of the air guidance device are that, on the one hand damages to the air guidance device while passing through an automatic car wash are avoided, and, on the other hand, the car wash will not automatically disconnect during the wash cycle. This is due to the fact that the washing brush is pressed from below against the air guidance device pivoting the air guidance device upward into a position which then results in a forward movement of the washing brush. After the washing brush passes over the air guidance device, the air guidance device is automatically returned into its operational position by means of a return motion device.

A locking device provided at the air guidance supporting means serves to pivot or swivel the air guidance device only upon reaching a defined power effect in certain embodiments; while the air guidance device remains in its proper position during shocks produced by the uneven surface of roads.

Further objects, features, and advantages of the present invention will become more apparent from the following description when taken with the accompanying drawings which show, for purposes of illustration only, several embodiments in accordance with the present invention.

DETAILED DESCRIPTION OF THE DRAWINGS

Figure 1:
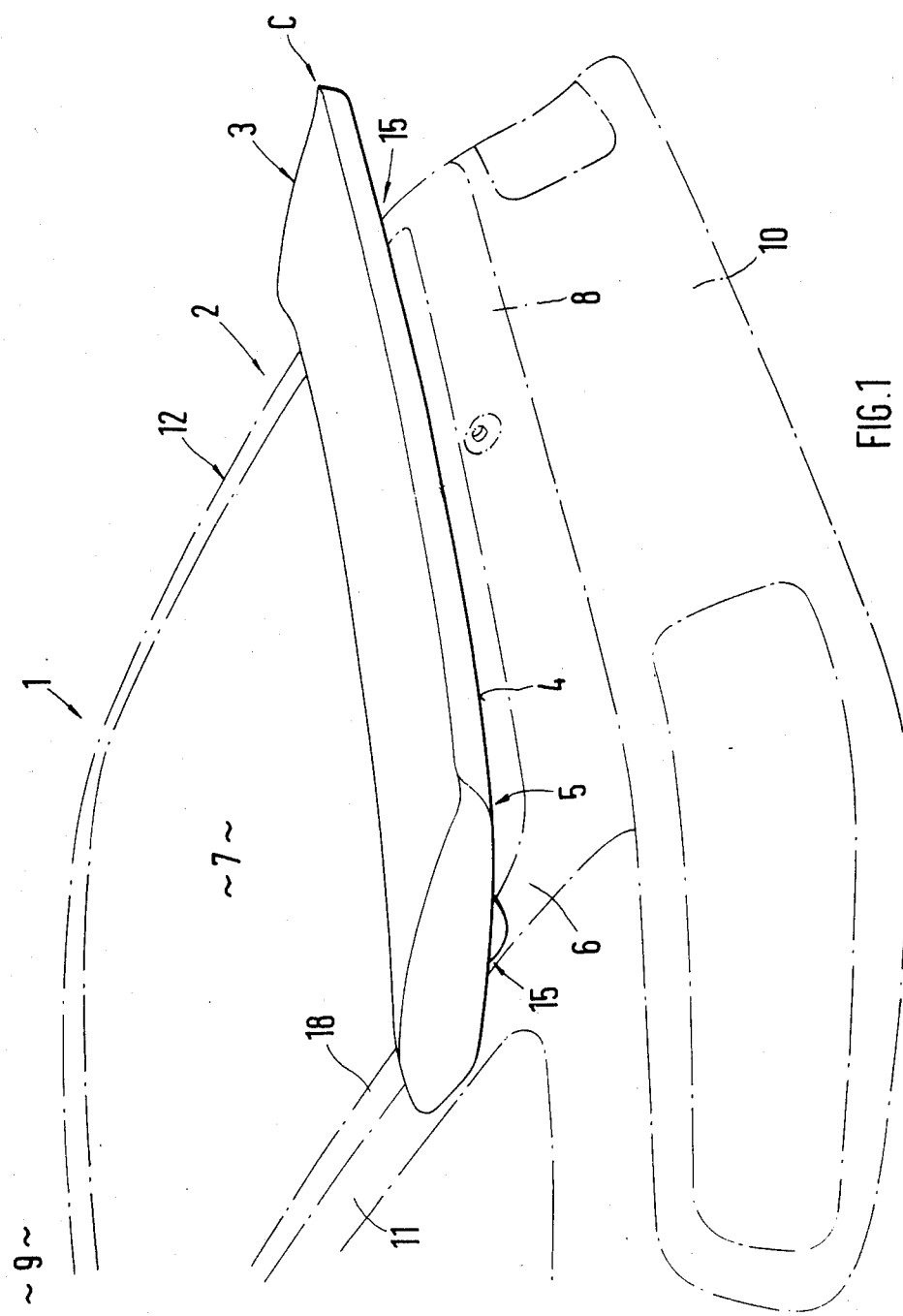
FIG. 1 is a schematic perspective partial rear view of a passenger motor vehicle having air guidance apparatus constructed in accordance with a preferred embodiment of the present invention.

A passenger vehicle 1 includes an aerodynamically-shaped air guidance device 3 at the rear of the vehicle 2 which extends over a substantial portion of the width of the vehicle in transverse direction. An end portion 4 of the air guidance device 3 positioned rearwardly when viewed in driving direction A, extends forming an approximately V-shaped opening 5 with an underlying vehicle body wall 6 (FIGS. 1 and 5).

The rearwardly extending vehicle body wall 6 is formed according to FIG. 1 by a trunk cover or hatchback lid 8 including a rear window 7. The trunk cover 8 is connected from above to a roof 9, below to an end part 10 produced from elastic material, and at both longitudinal sides by means of side elements 11, 12.

Figure 5:
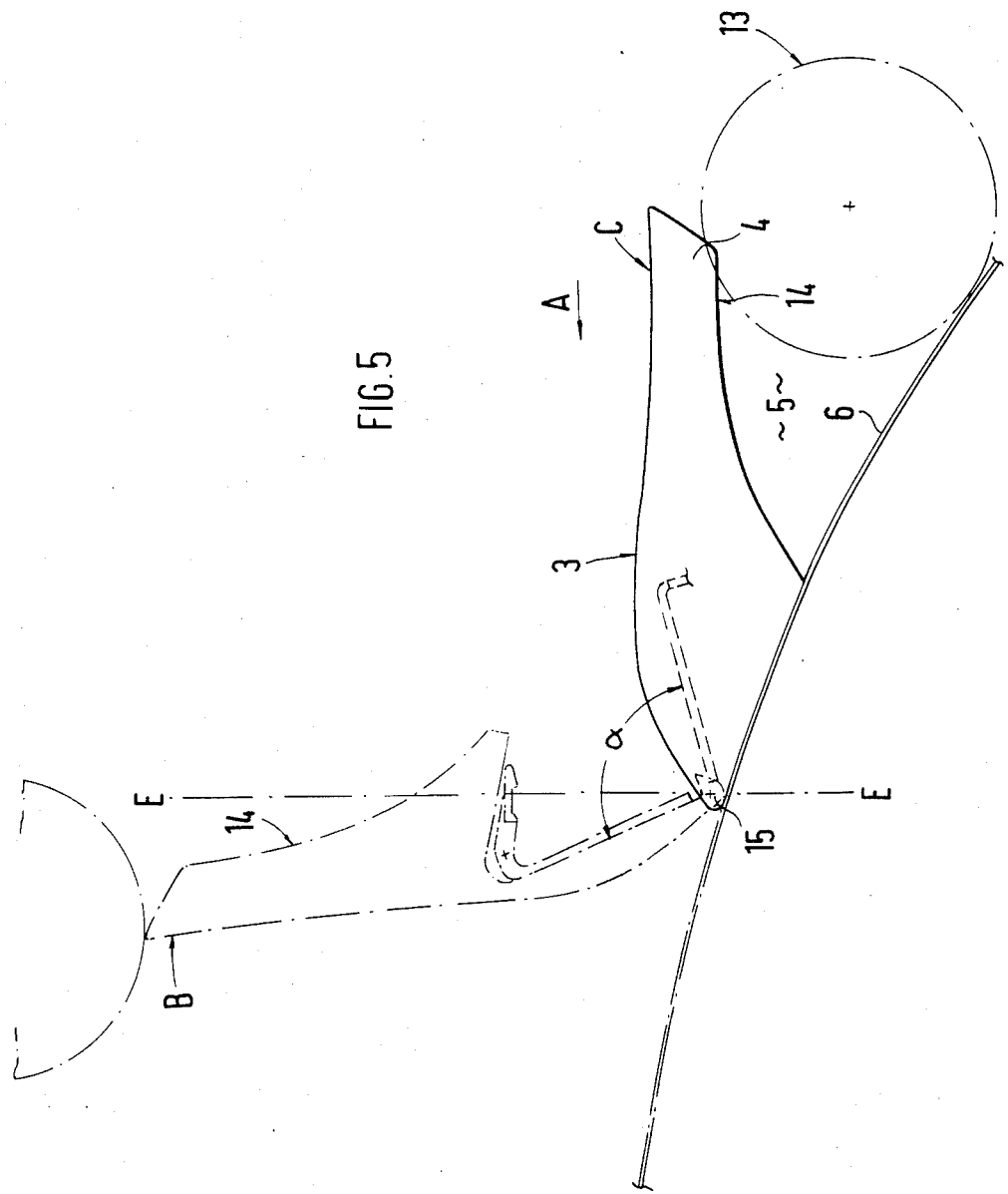
FIG. 5 is a side view of the air guidance apparatus of FIG. 1 showing possible rotational capabilities in response to external forces.

In order for a washing brush 13, being part of an automatic car wash and borne about a horizontal transverse axis, not to lock itself during its rotational movement in driving direction A into the V-shaped opening 5, namely between a lower side 14 of the rear end portion 4 and the vehicle body wall 6, the air guidance device 3 is pivotally attached by means of at least hinge 15 to the vehicle body wall 6, and performs an upward swivelling motion into a resistance reducing position B (FIG. 5). A horizontally extending hinge axis 16 of the hinge 15 viewed in driving direction A is arranged adjacent the front end of the air guidance device 3.

Figure 9:
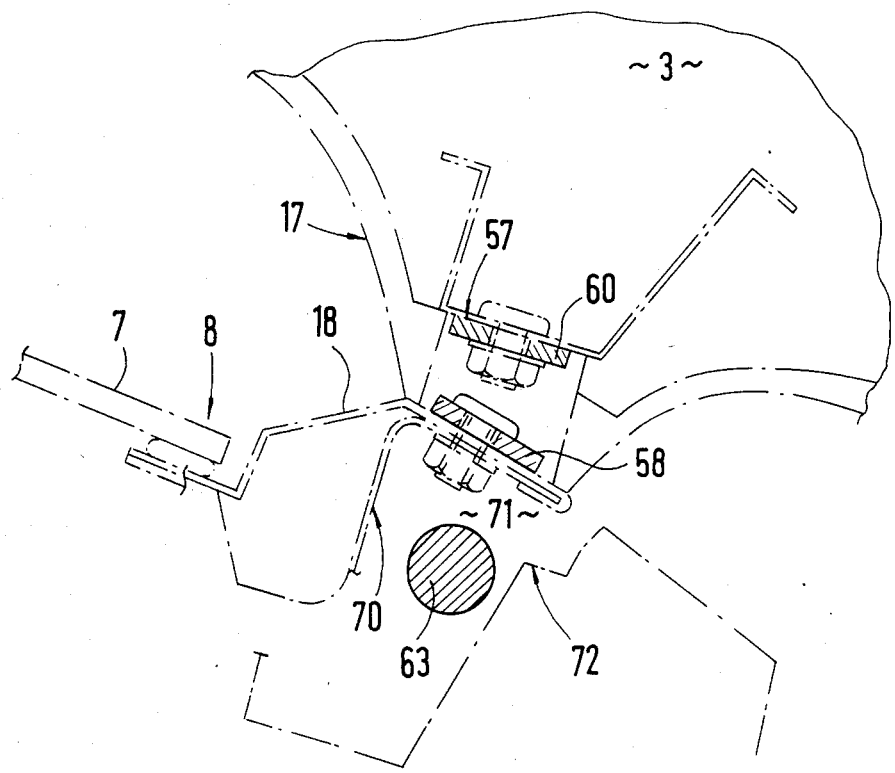
FIG. 9 is a cross-sectional view along line IX—IX of FIG. 7.
Figure 10:
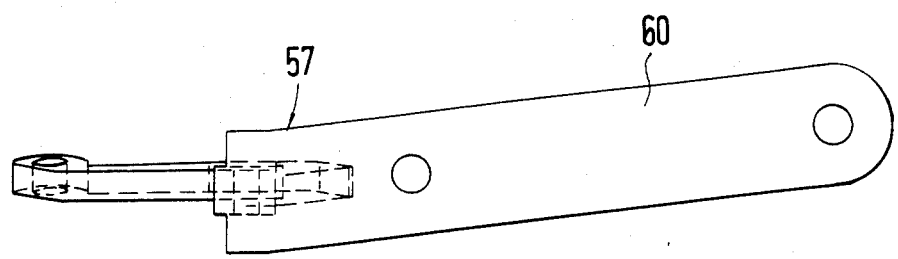
FIG. 10 is a top view of the connecting arrangement of FIG. 9, taken in arrow direction S of FIG. 7, showing hinge half attached to air guidance device.
Figure 11:
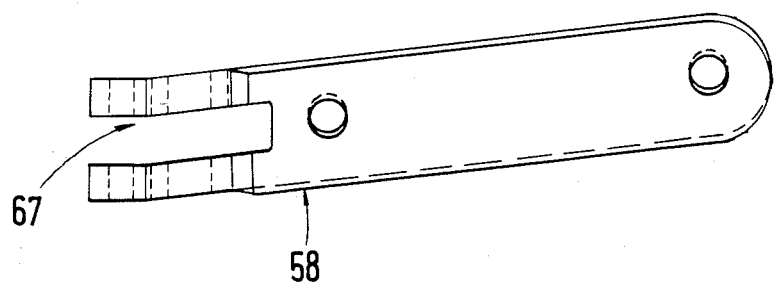
FIG. 11 is a top view similar to FIG. 10 of the hinge half portion being fixedly attached to the side of the vehicle body.

Preferably, two hinges 15 attached on opposite sides of the vehicle provide the connecting means between the air guidance device 3 and the vehicle body wall 6; the axes 16 of said hinges are thereby in true alignment with each other. The hinges 15 are arranged in outwardly located support sections 17 of the air guidance device 3, whereby each support section 17 rests at a body frame side part 18 of the trunk cover 8 (FIG. 9). The hinges are therefore attached to the air guidance apparatus near the horizontal sides of the air guidance device.

The air guidance device 3 extends between the two support sections 17 at a spacing from the underlying rear window 7 and has a wing-like, cross-sectional profile.

Figure 6:
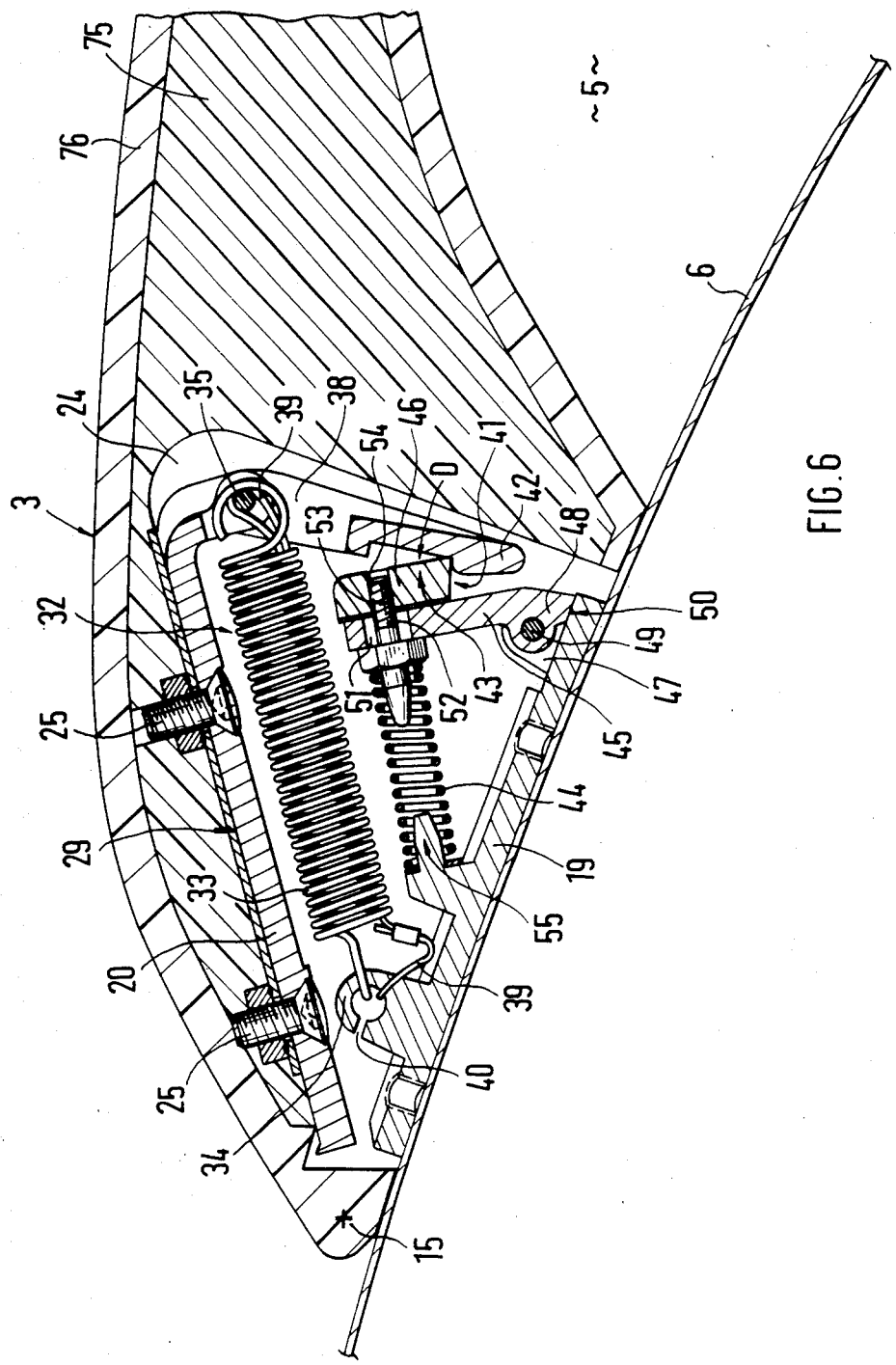
FIG. 6 is a cross-sectional view along VI—VI of FIG. 3.

In accordance with a first embodiment (FIGS. 3 and 4) each hinge 15 includes two hinge portions 19, 20 having ends 21, 22, positioned in front when seen in driving direction A, pivotally connected to each other by means of a horizontally extending hinge pin or bar 23. The stationary hinge section 19 is connected by means of (not further illustrated) fastening elements to the trunk cover 8, while the pivotable hinge section 20, on the other hand, protrudes into a recess 24 of the air guidance device 3 and is retained in its position via screws 25 (FIG. 6).

The hinge section 19 in its side view (FIG. 4) exhibits an almost straight course; the other hinge section 20, on the other hand, is composed of several obliquely adjoining legs 26, 27. A first section 28 of leg 26 is arranged about parallel to the hinge portion 19, while a second section 29 extends in an acute angle to the hinge portion 19 and slopes upwardly thereto. The other leg 27 of the hinge portion 20 slopes downwardly guiding a free end 30 of the leg 27 to a rearward end 31 of the hinge portion 19.

Figure 2:
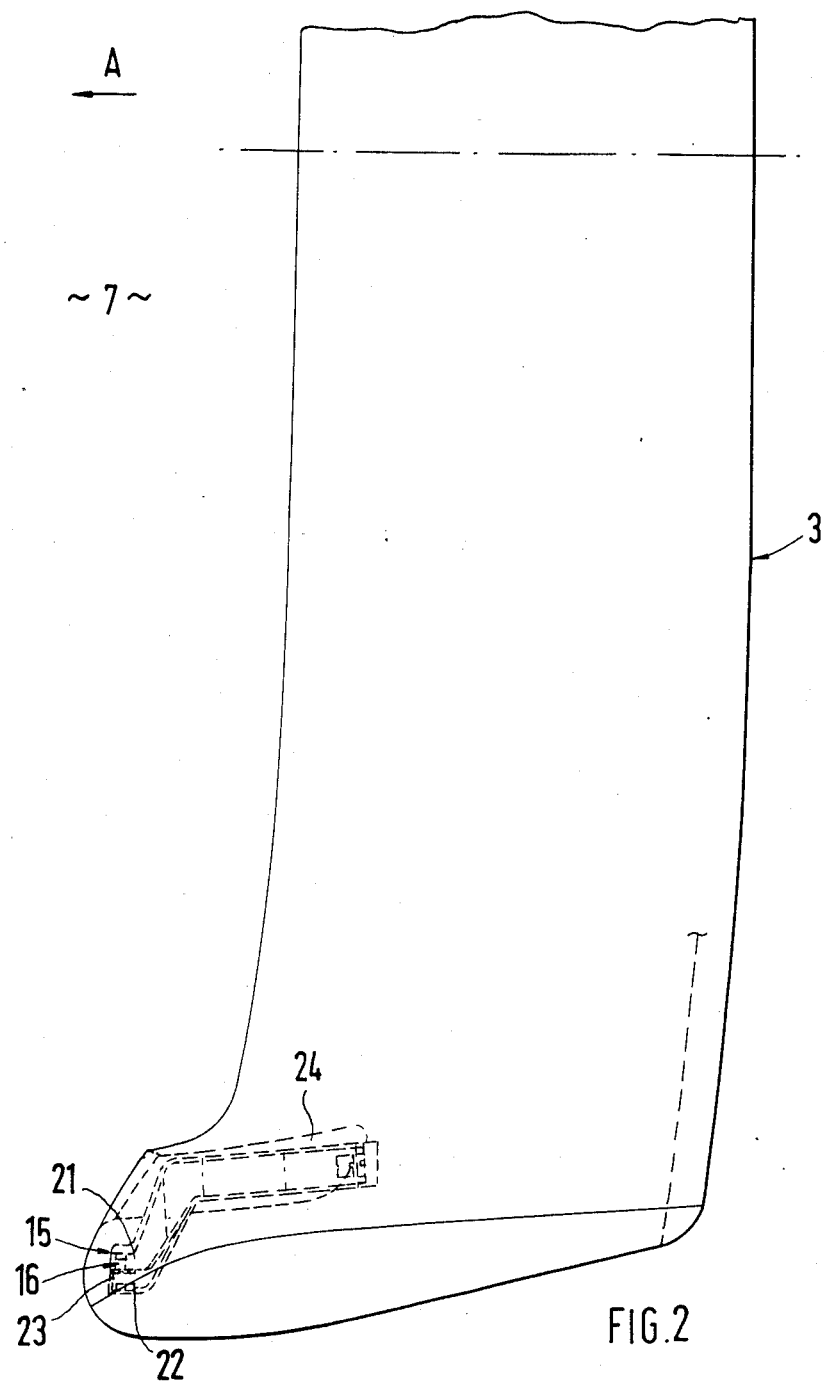
FIG. 2 is a partial schematic top view of the air guidance apparatus of FIG. 1, detailing the location of a connecting device.
Figure 3:
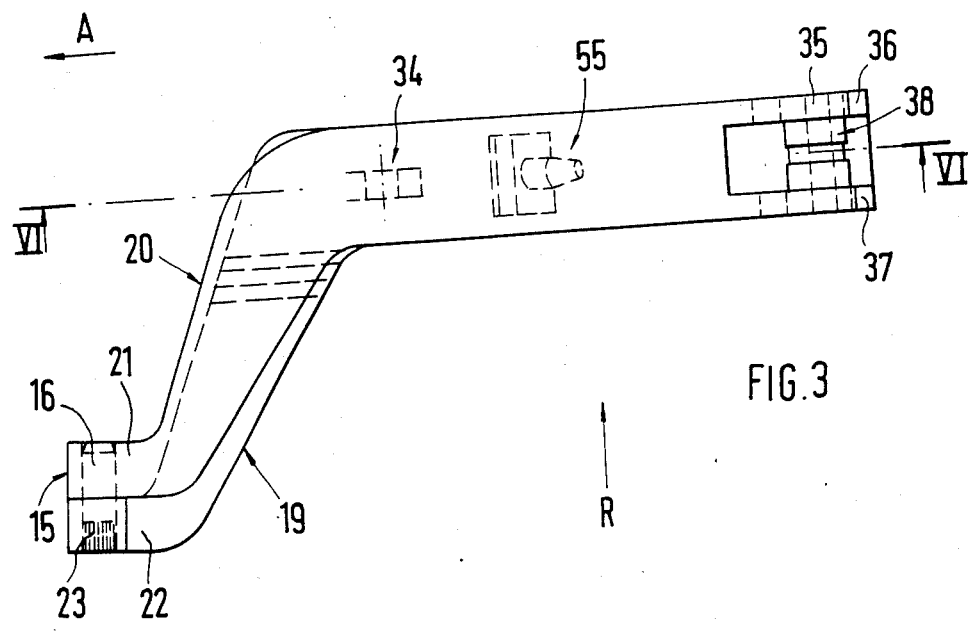
FIG. 3 is an enlarged top view of a hinge arrangement of the air guidance apparatus of FIGS. 1 and 2.
Figure 4:
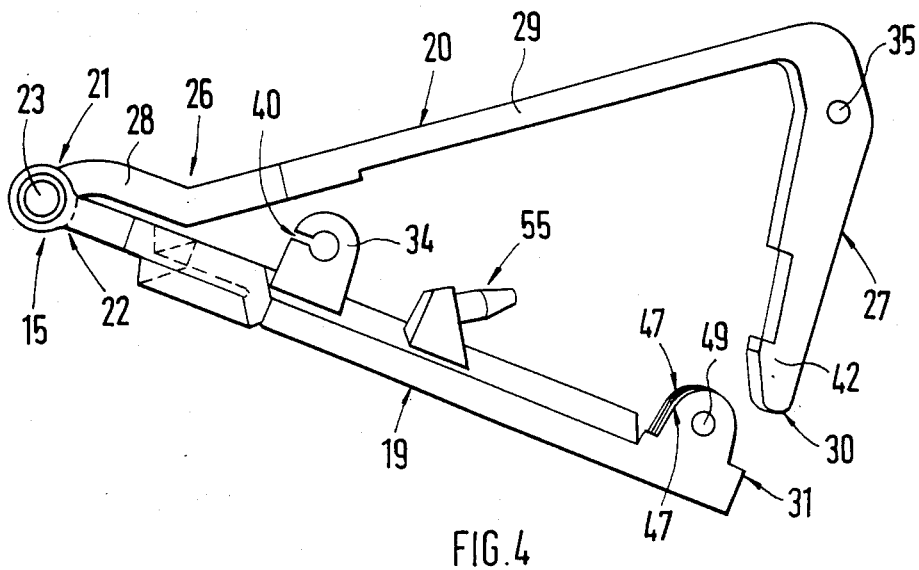
FIG. 4 is a side view of the hinge arrangement taken in the arrow direction R of FIG. 3.

Both hinge portions 19, 20 when viewed from above, can either be arranged in a straight line, or as is shown in FIGS. 2 and 3 are shaped in an angle. In the latter instance, the two ends 21, 22 of the hinge sections 19, 20 connected to each other by means of the hinge pin or bar 23, are laterally offset from the areas fixedly connecting the hinge portions 19, 20 with the air guidance device 3 and the trunk cover 8.

A return motion device 32 is provided between the hinge portion 19 and hinge portion 20 which automatically returns the air guidance device 3 into its operational position C after a washing brush 13 has passed over the air guidance device. The return motion device 32 in accordance with FIG. 6 is provided with a tension spring 33 extending about parallel to the section 29 of the hinge portion 20, and is attached, on the one hand, to the stationary hinge portion 19 and, on the other hand, to the pivotable hinge portion 20.

One end of the tension spring 33 is thereby engaged into a ring hook 34 adjacently arranged to the hinge axis 16 and preferably formed as an integral part of the hinge portion 19. The other, rearward end of the tension spring 33 is coupled to a bolt 35 provided in the upper area of leg 27 of the hinge portion 20. Bolt 35 extending in transverse direction connects two wall sections 36, 37 of leg 27. A recess 38 is provided between the two wall sections 36, 37. Said wall sections are preferably substantially symmetrical and are spaced apart from each other by the portion of the bolt 35 to which spring 33 is connectable.

The swivelling motion of the air guidance device 3 is limited by means of a back-up line 39 extending in part within the tension spring 33 and being fixedly attached to the ring hook 34 and the bolt 35, respectively. The ring hook 34 includes locally a slot 40 for inserting the back-up line 39.

In order to avoid swivelling motions of the air guidance device 3 during driving, for example, due to uneven road conditions, each hinge 15 is provided with a disengageable locking device 41. The locking device 41 includes a hook-shaped, stationary support member 42 cooperating with a second, movable support member 43 of the other hinge portion 19 whereby the movable support member 43 is tensioned by means of a compression spring 44 against the other support member 42. The hook-like support member 42 is arranged in one piece with the leg 27 of the movable hinge portion 20.

The support member 43 is formed by means of a lever 45 and a sliding block 46. In locking position D of the locking device 41, the sliding block 46 forms a functional connection with the support member 42. One end of the lever 45 is rotatably arranged at the hinge portion 19. For this purpose, two bearing support means 47 adjacently arranged at a spacing from each other at the hinge portion 19 supporting via an axis 49 a bearing section 48 of lever 45. A stop 50 arranged at lever 45 adjacent the bearing section 48 is supported by the underlying hinge portion 19. This allows the swivelling motion of the support member 43 only in the driving direction A. The sliding block 46 when viewed in direction of elevation, is adjustably attached to lever 45. Lever 45 for this purpose is provided with a bore hole 51 of a larger diameter than a threaded portion 52 of a retainer pin 53 engaged therein. One end of the retainer pin 53 is screwed into a threaded bore hole 54 of the sliding block 46. Opposite thereto another section of the retainer pin 53 is conically configured and receives one end of the compression spring 44. The other end of the compression spring 44 cooperates with a protruding retainer section 55 of the hinge section 19.

Figure 7:
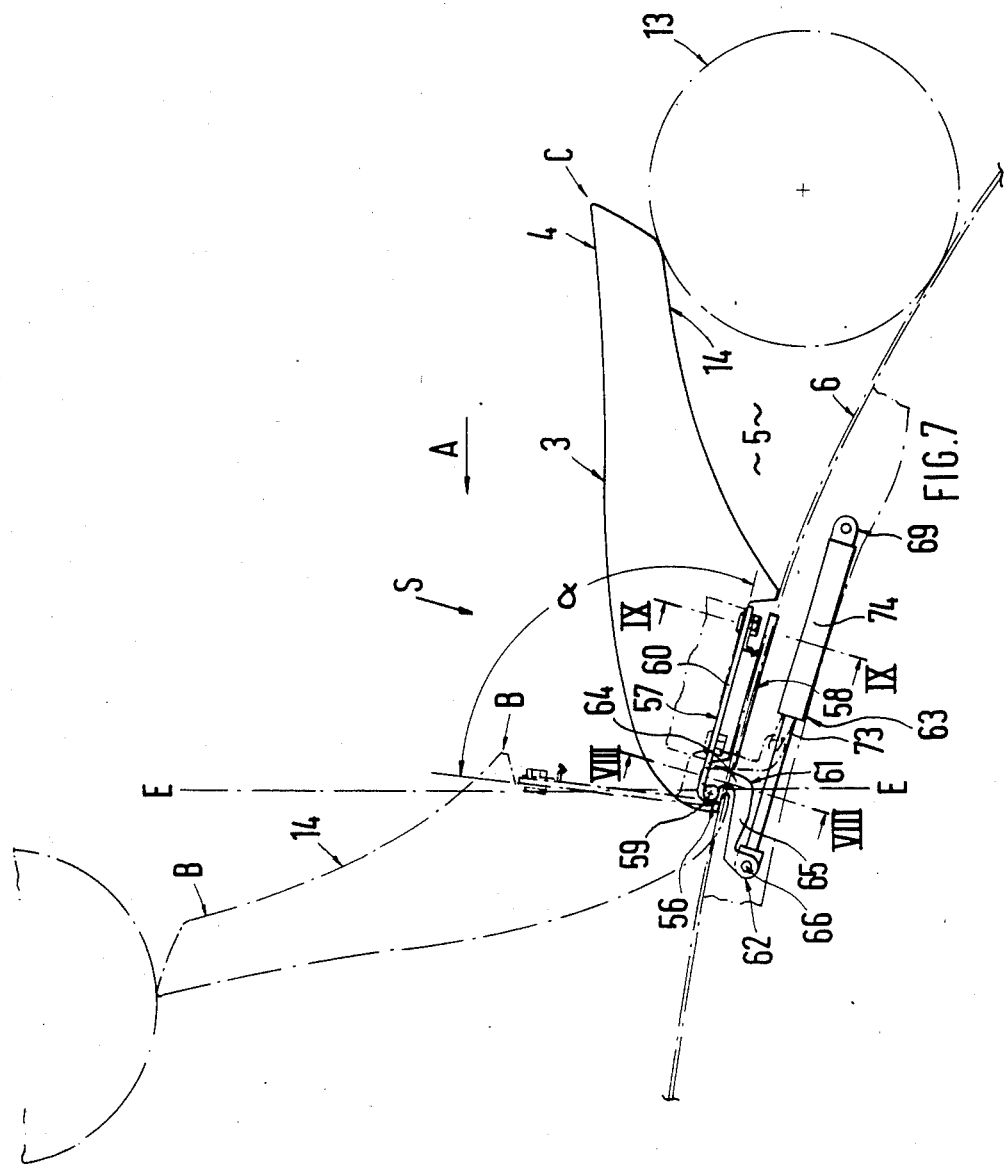
FIG. 7 is a longitudinal cross-sectional view through air guidance apparatus with a hinge constructed in accordance with another preferred embodiment of the invention.

FIGS. 7 through 11 depict a further embodiment of an air guidance device 3 swivelly borne at the rear of a motor vehicle. A hinge 56 is provided as engaging means for this air guidance device 3 formed by hinge portions 57 and 58. When seen in driving direction A, the two hinge portions 57, 58 are pivotally connected to each other in a forward area by means of a hinge pin 59. The hinge portion 57 fixedly attached to the air guidance device 3 is formed as a knee lever including a horizontally directed lever arm 60 screwed from underneath into the air guidance device 3 (FIG. 7). The other lever arm 61 extending approximately vertical and exhibiting a double angle, is connected with its free end 62 to a pneumatic spring 63 which is arranged about parallel to the lever arm 60 of the hinge portion 57 in the operational position C of the air guidance device 3.

The lever arm 61 includes a slopingly and downwardly extending connector bar 64 adjacent the hinge pin 59 connecting a section 65 extending in driving direction and having a front end angled up in a sloping fashion. A front engagement point 66 of the pneumatic spring 63 is positioned further in front than the hinge pin 59 when viewed in driving direction A.

The hinge section 58 fixedly attached to the tank cover 8 linearly configured and including a slot opening 67 in its front area for slopingly guiding the angled-up lever arm 61 of the other hinge portion 57.

Figure 8:
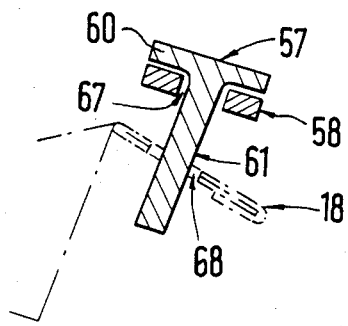
FIG. 8 is a cross-sectional view along line VIII—VIII of FIG. 7.

The vertically extending lever arm 61 additionally protrudes from a recess 68 of the tank cover 8 (FIGS. 7 and 8).

The rear engagement point 69 of the pneumatic spring 63 is provided at the hood 8 and more particularly at an upright wall section 70 of same. The pneumatic spring 63 is arranged hidden in a channel-shaped hollow space 71 between the pivotable (hood) 8 and a stationary side frame 72 of the vehicle body.

The pneumatic spring 63 in this second embodiment simultaneoulsy performs the function of a return motion and locking device. The pneumatic spring 63 exhibits its maximum stroke in the operational position C of the air guidance device 3. The piston bar 73 of the pneumatic spring 63 is almost entirely driven back into the cylinder 76 during the upright swivelled position B of the air guidance device 3.

In both of the embodiments the air guidance device 3 is pivoted about an angle greater than 90°, in such a manner that the lower side 14 of the rearward end region 4 is moved forwardly and beyond a vertical plane E—E.

The air guidance device 3 in accordance with FIG. 5 is comprised of a rigid expanded polyurethane core 75 which on all sides with the exception of the recess area 24, is surrounded by a thin-walled, soft foam pad 76.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. Apparatus for guiding air flow adjacent a passenger vehicle body or the like, comprising:
air guidance means for guiding air flow adjacent body surface portions of said vehicle body and
support means for supporting said air guidance means at said vehicle body,
at least one of said air guidance means and said support means including force cushioning means for permitting movement of at least a rear portion of said air guidance means in response to externally applied forces such as experienced in car washes and the like from a position of greater resistance to the applied force to a position of lesser resistance to the applied force.

2. Apparatus according to claim 1, wherein said support means includes force cushioning means for permitting movement of at least a portion of said air guidance means in response to externally applied forces such as experienced in a car wash and the like.

3. Apparatus according to claim 2, wherein said support means includes connecting means attaching said air guidance means to said vehicle exterior surface, said connecting means including at least one hinge for accommodating pivotal movement of the air guidance means.

4. Apparatus according to claim 3, wherein said connecting means is pivotable upward, when viewed from behind looking in driving direction, in response to externally applied forces such as experienced from a horizontally postioned cleaning brush of a car wash moving in driving direction.

5. Apparatus according to claim 2, wherein said connecting means attaches said air guidance means to the rear of a passenger vehicle in a transverse and longitudinal direction wherein at least one portion of said air guidance means forms a V-shaped opening with said underlying vehicle body surface portions and when said air guidance means is subject to external forces, such as a horizontally positioned cleaning brush of a car wash, said air guidance means responds by pivoting.

6. Apparatus according to claim 2, wherein hinges, preferably two hinges, are adjacently provided between said air guidance device means and said vehicle body surface portions in relative distance to each other, and the hinge axes are in true alignment with respect to each other.

7. Apparatus according to claim 1 wherein each hinge is formed of two hinge portions having front ends that are connected to each other by means of a horizontally extending bar or pin, wherein one-half of said hinge is fixedly attached to said underlying vehicle body surface portions while the other half of said hinge protrudes into a recess of said air guidance means and is connected thereto.

8. Apparatus according to claim 3, wherein each hinge is provided with a return motion device means for said movable hinge half.

9. Apparatus according to claim 8, wherein said return motion device means is provided with a tension spring attached with its one free end to the stationary half of said hinge and, with its other end to the swivable half of said hinge.

10. Apparatus according to claim 2, wherein said force cushioning means, such as a pneumatic spring or air actuated cylinder cushion, also acts as a return motion device means.

11. Apparatus according to claim 10, wherein said force cushioning means is fixedly attached with its one free end to a knee lever forming the hinge portion, and is with its other end rotatably attached to a trunk cover or hatch-back lid.

12. Apparatus according to claim 10, wherein said force cushioning means extends, in a hidden manner, within a channel-like hollow space underneath said vehicle body surface portions.

13. Apparatus according to claim 2, wherein said air guidance means is held in position by means of a disengageable locking device.

14. Apparatus according to claim 13, wherein said locking device is formed by a hook-shaped support member arranged at a movable hinge portion cooperating with a corresponding movable support member of a stationary hinge portion, wherein said movable support member is pretensioned by means of a compression spring against the other said support member.

15. Apparatus according to claim 14, wherein said movable support member is formed by a lever fixedly attached to one side, and a sliding block wherein said adjustably arranged sliding block engages to form a functional connection with said hook-shaped support member.

16. Apparatus according to claim 9, wherein a back-up line limiting the swivel motion of said movable hinge portion extends in part within said tension spring and is fixedly attached with its one free end at a ring hook of said stationary hinge portion and, with its other end, at a bolt of said movable hinge portion.

17. Apparatus according to claim 1, wherein said air guidance means is swivelled about an angle larger than 90° with respect to driving direction in a manner such that a lower side of a rearward end region of said guidance means is moved forward and beyond a vertical plane.

18. Apparatus according to claim 1, wherein said movement of a rear portion of said air guidance device includes movement of a rearward end portion of said air guidance device through at least a pre-determined angle.

19. Apparatus according to claim 1, wherein said air guidance device has stop means to position said air guidance device in a position for use during normal driving operations.

20. The arrangement according to claim 19, wherein said stop means includes locking means for holding said air guidance device in position during normal operation of the vehicle.

21. Apparatus for guiding air flow adjacent a passenger vehicle body or the like, comprising:
- air guidance means for guiding air flow adjacent body surface portions of said vehicle body,
- support means for supporting said air guidance means at said vehicle body,
- said support means includes force cushioning means for permitting movement of at least a portion of said air guidance means in response to externally applied forces such as experienced in a car wash and the like,
- said support means includes connecting means attaching said air guidance means to said vehicle exterior surface, said connecting means including at least one hinge for accommodating pivotal movement of the air guidance means, and
- wherein each hinge is provided with a return motion device means for said movable hinge half.

22. Apparatus according to claim 21, wherein said return motion device means is provided with a tension spring attached with its one free end to the stationary half of said hinge and, with its other end to the swivable half of said hinge.

23. Apparatus for guiding air flow adjacent a passenger vehicle body or the like, comprising:
- air guidance means for guiding air flow adjacent body surface portions of said vehicle body,
- support means for supporting said air guidance means at said vehicle body,
- said support means includes force cushioning means for permitting movement of at least a portion of said air guidance means in response to externally applied forces such as experienced in a car wash and the like,
- wherein said force cushioning means, such as pneumatic spring or air actuated cylinder cushion, also acts as a return motion device means.

24. Apparatus according to claim 23, wherein said force cushioning means is fixedly attached with its one free end to a knee lever forming the hinge portion, and is with its other end rotatably attached to a trunk cover or hatch-back lid.

25. Apparatus according to claim 23, wherein said force cushioning means extends, in a hidden manner, within a channel-like hollow space underneath said vehicle body surface portions.

26. Apparatus for guiding air flow adjacent a passenger vehicle body or the like, comprising:
- air guidance means for guiding air flow adjacent body surface portions of said vehicle body,
- support means for supporting said air guidance means at said vehicle body,
- said support means includes force cushioning means for permitting movement of at least a portion of said air guidance means in response to externally applied forces such as experienced in a car wash and the like, and
- wherein said air guidance means is held in position by means of a disengageable locking device.

27. Apparatus according to claim 26, wherein said locking device is formed by a hook-shaped support member arranged at a movable hinge portion cooperating with a corresponding movable support member of a stationary hinge portion, wherein said movable support member is pretensioned by means of a compression spring against the other said support member.

28. Apparatus according to claim 27, wherein said movable support member is formed by a lever fixedly attached to one side, and a sliding block wherein said adjustably arranged sliding block engages to form a functional connection with said hook-shaped support member.

29. Apparatus according to claim 22, wherein a back-up line limiting the swivel motion of said movable hinge portion extends in part within said tension spring and is fixedly attached with its one free end at a ring hook of said stationary hinge portion and, with its other end, at a bolt of said movable hinge portion.

30. Apparatus for guiding air flow adjacent a passenger vehicle body or the like, comprising:
- air guidance means for guiding air flow adjacent body surface portions of said vehicle body,
- support means for supporting said air guidance means at said vehicle body,
- at least one of said air guidance means and said support means including force cushioning means for permitting movement of at least a portion of said air guidance means in response to externally applied forces such as experienced in car washes and the like, and
- wherein said force cushioning means, such as pneumatic spring or air actuated cylinder cushion, also acts as a return motion device means.

31. Apparatus according to claim 30, wherein said force cushioning means extends, in a hidden manner, within a channel-like hollow space underneath said vehicle body surface portions.

32. Apparatus for guiding air flow adjacent a passenger vehicle body or the like, comprising:
- air guidance means for guiding air flow adjacent body surface portions of said vehicle body,
- support means for supporting said air guidance means at said vehicle body,
- at least one of said air guidance means and said support means including force cushioning means for permitting movement of at least a portion of said air guidance means in response to externally applied forces such as experienced in car washes and the like, and
- wherein said air guidance means is held in position by means of a disengageable locking device.

33. Apparatus according to claim 32, wherein said locking device is formed by a hook-shaped support member arranged at a movable hinge portion cooperating with a corresponding movable support member of a stationary hinge portion, wherein said movable support member is pretensioned by means of a compression spring against the other said support member.

34. Apparatus according to claim 32, wherein said movable support member is formed by a lever fixedly attached to one side, and a sliding block wherein said adjustably arranged sliding block engages to form a functional connection with said hook-shaped support member.

* * * * *